United States Patent [19]

Krohn et al.

[11] Patent Number: 5,076,761
[45] Date of Patent: Dec. 31, 1991

[54] SAFETY DRIVE CIRCUIT FOR PUMP MOTOR

[75] Inventors: Duane D. Krohn; Greg M. Gibbons, both of Westminister, Colo.

[73] Assignee: Graco Inc., Minneapolis, Minn.

[21] Appl. No.: 543,687

[22] Filed: Jun. 26, 1990

[51] Int. Cl.⁵ ............................................. F04B 49/02
[52] U.S. Cl. .......................................... 417/18; 417/45
[58] Field of Search ..................... 417/18, 19, 20, 45

[56] References Cited

U.S. PATENT DOCUMENTS

| | | | |
|---|---|---|---|
| 3,953,777 | 4/1976 | McKee | 417/45 X |
| 4,024,864 | 5/1977 | Davies et al. | 417/20 X |
| 4,108,574 | 8/1978 | Bartley | 417/20 X |
| 4,221,543 | 9/1980 | Cosentino et al. | 417/45 X |
| 4,397,610 | 9/1983 | Krohn | 417/44 |
| 4,795,314 | 1/1989 | Prybella et al. | 417/45 X |
| 4,986,919 | 1/1991 | Allington | 417/45 |
| 4,990,057 | 2/1991 | Rollins | 417/18 X |

Primary Examiner—Leonard E. Smith
Attorney, Agent, or Firm—Paul L. Sjoquist

[57] ABSTRACT

A DC motor drive system for mechanically linking to a reciprocable pump, having safety circuits for disconnecting power from the system upon detection of excessive line voltage variations, excessive line current variations, excessive pressure demands, and electrical and mechanical faults which may occur in system operation.

9 Claims, 8 Drawing Sheets

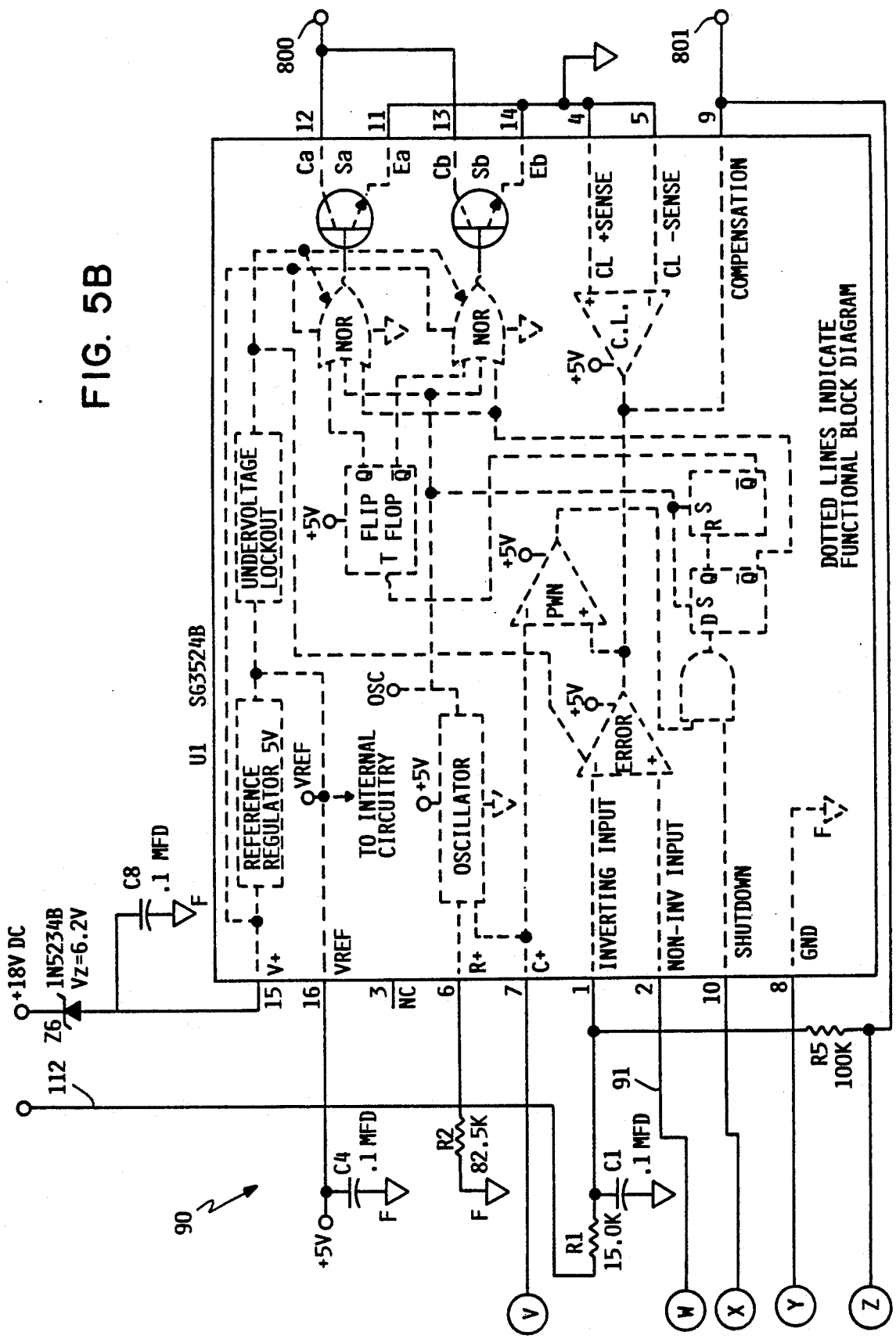

SAFETY DRIVE CIRCUIT FOR PUMP MOTOR

BACKGROUND OF THE INVENTION

This invention relates to direct-current motor drive circuits; more particularly, the invention relates to a safety drive circuit for a DC motor utilized in a liquid pumping system. The DC drive motor is mechanically linked to a reciprocable pump, wherein the pump must reciprocate at a variable rate in order to deliver liquids under predetermined pressure and volume conditions.

The invention is related to U.S. Pat. No. 4,397,610, owned by the assignee of the present invention, which is incorporated by reference herein. The prior patent discloses a pumping system utilizing a DC motor mechanically linked to a reciprocable pump, with a particular motor speed control circuit. The present invention is an improvement over the prior patent, particularly with regard to a number of different safety features which are incorporated into the invention.

Among the problems associated with the use of DC drive motors to drive reciprocable pumps are the problems of monitoring and controlling the electrical loading caused by the motor, since the motor is operated under variable speed conditions, ranging from stall conditions to relatively high rotational rates. Motor speed is regulated by a speed control circuit which monitors output liquid pressure and receives a fixed voltage set point input representative of the desired pressure operational point. The speed control circuit generates drive voltages to control motor speed and torque so as to equalize the output pressure at the preset operating point. The liquid delivery system to which the pump is connected may operate under flow conditions ranging from a blocked flow condition to a predetermined maximum delivery volume, all at a preset pressure requirement. Motor speed is controlled to deliver the liquid under any of these flow conditions, while maintaining the pressure at the desired setting. The motor speed control circuit is adversely affected by over-voltage conditions which may occur as a result of line voltage fluctuations, over current conditions which may result from a variety of factors, over-pressure conditions which may result from component malfunctions, motor stall conditions which may result under certain heavy loading conditions, and motor runaway conditions which may result from problems with the liquid delivery system. All of these conditions can lead to damage or destruction to the DC motor, or to the speed control circuits which drive the motor, and therefore it is important that safety features be incorporated to monitor for these conditions and to provide safe operating shutdown in the event any of these conditions occur.

SUMMARY OF THE INVENTION

The present invention provides an improvement in safety drive circuits for DC motors used in pumping systems. The invention includes safety circuits for monitoring and controlling over-voltage conditions occurring as a result of line voltage fluctuations, safety circuits for monitoring and controlling excessive line current draw, safety circuits for monitoring and controlling excessive output liquid pressure demands, safety circuits for monitoring and controlling excessive motor stall conditions and excessive motor runaway conditions. The invention also incorporates safety circuits for monitoring excessive motor temperatures, and all of these circuits are utilized to shut down power to the motor and the motor speed control circuits whenever a detected fault occurs.

It is the principal object of the present invention to provide a DC motor drive circuit having safety features for shutting down the system whenever any of a number of known fault conditions exist.

It is another object of the present invention to provide a DC motor drive circuit for controlling a motor mechanically linked to a reciprocable pump, for delivering liquid under predetermined volume and pressure conditions, wherein pressure is maintained at a constant value over widely varying volume flow rates.

The foregoing and other objects and advantages will become apparent from the appended specification hereto, and with reference to the drawings which are described hereafter.

DESCRIPTION OF THE PREFERRED EMBODIMENT

Figure 1:
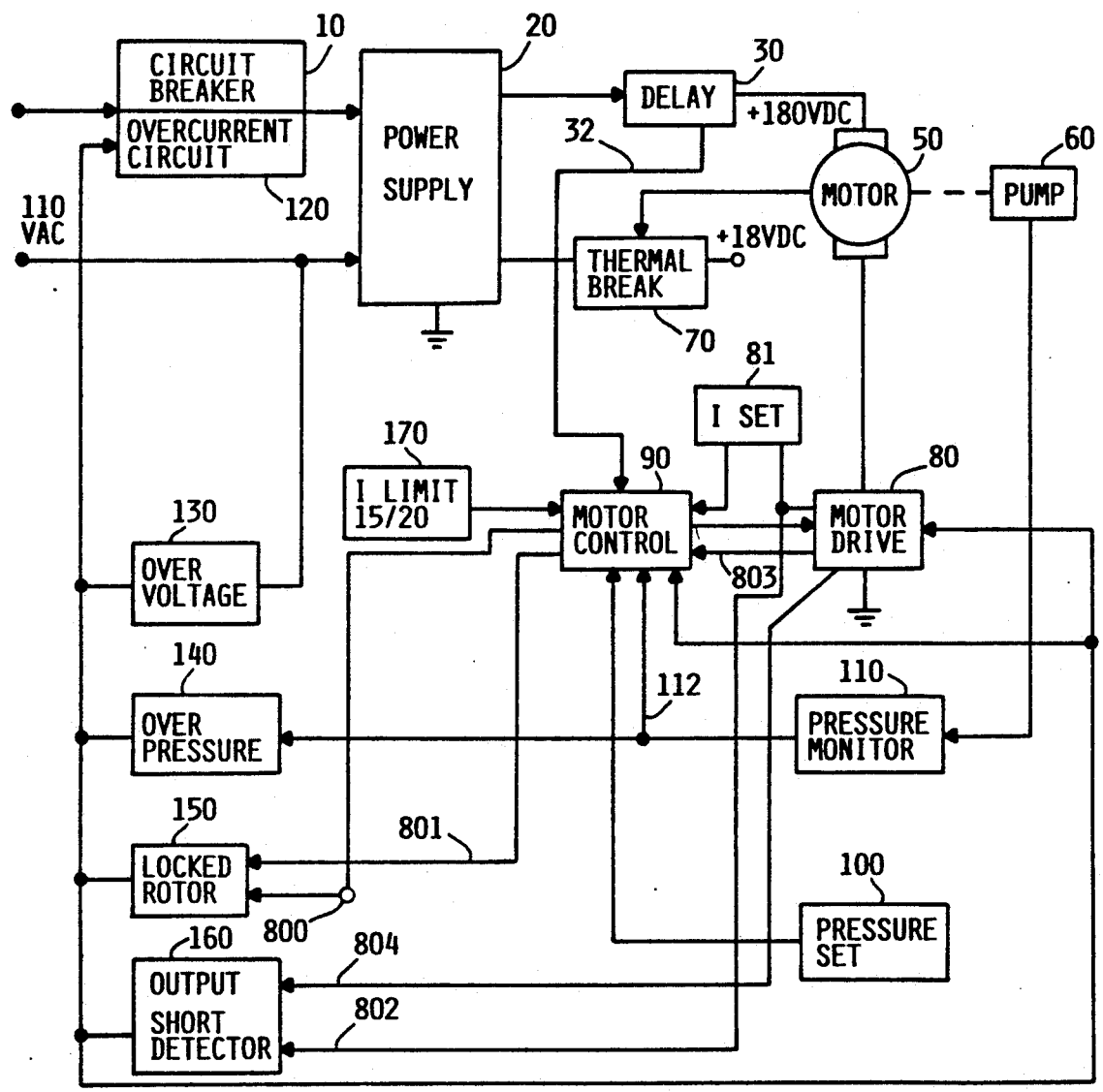
FIG. 1 shows a block diagram of the circuits of the present invention.

Referring first to FIG. 1, there is shown a block diagram of the circuits of the present invention. The invention is intended for operation upon connection to a standard 110 volt alternating current voltage supply. The alternating voltage supply is connected to a power supply 20 via a breaker circuit 10. The power supply 20 produces two DC output voltages; a voltage of 180 volts DC is produced after a delay interval determined by delay circuit 30, and a DC voltage of 18 volts is produced to provide the operating power for the circuits described herein. The higher DC voltage is connected to a DC motor 50, which is mechanically linked to a reciprocable pump 60, both of which may be of the type described in the prior art patent referenced herein. Motor 50 has a thermal safety relay 70, which is connected in series with the lower DC voltage supply. The drive voltage to motor 50 is controlled by a motor drive circuit 80, which is operated by a motor control circuit 90. The motor control circuit 90 receives a first input control signal from a pressure set circuit 100; this signal may be manually preset by an operator to a predetermined desired output pressure value. Motor control circuit 90 also receives a second input from a pressure monitor circuit 110; pressure monitor circuit 110 is coupled via a pressure transducer to the output liquid delivery line, to monitor the liquid delivery pressure.

The invention utilizes a plurality of safety control circuits, for ensuring that the system will operate within overall safe parameters. An over-current circuit 120 is connected to monitor the input AC line current, and to generate a signal to circuit breaker 10 to disconnect the input line voltage under excessive line current conditions. An over-voltage monitoring circuit 130 is connected to monitor the input AC voltage, and to generate a signal to circuit breaker 10 to disconnect the input line voltage upon detecting an excessive input line voltage. An over-pressure circuit 140 is connected to the pressure monitor circuit 110, and generates a signal to circuit breaker 10 whenever output pressures exceed a predetermined preset maximum value. Upon detection of this condition, circuit breaker 10 disconnects the input line voltage from the system. A locked rotor circuit 150 is connected to monitor the combination of the duty cycle due to current limiting, which is set by the I LIMIT circuit 170, and an error voltage, due to pressure sensed by pressure monitor circuit 110, received from motor control circuit 90. When the monitored combination of high error signal and low motor duty cycle exceed predetermined limits, locked rotor circuit 150 generates a signal to circuit breaker 10, to disconnect the input line voltage from the system and a signal to motor control circuit 90 to stop the output to motor 50. An output short detector circuit 160 is connected to monitor the DC drive current through motor drive circuit 80 via line 802, and also to monitor the signal representative of motor turn-on from motor drive circuit 80. Whenever the signal on line 802 exceeds a predetermined preset value, output short circuit 160 generates a signal to circuit breaker 10 to disconnect the input line voltage from the system, shorts the gate drive (FIG. 3, line 806) to motor drive circuit 80 and turns off motor control circuit 90.

Figure 2A:
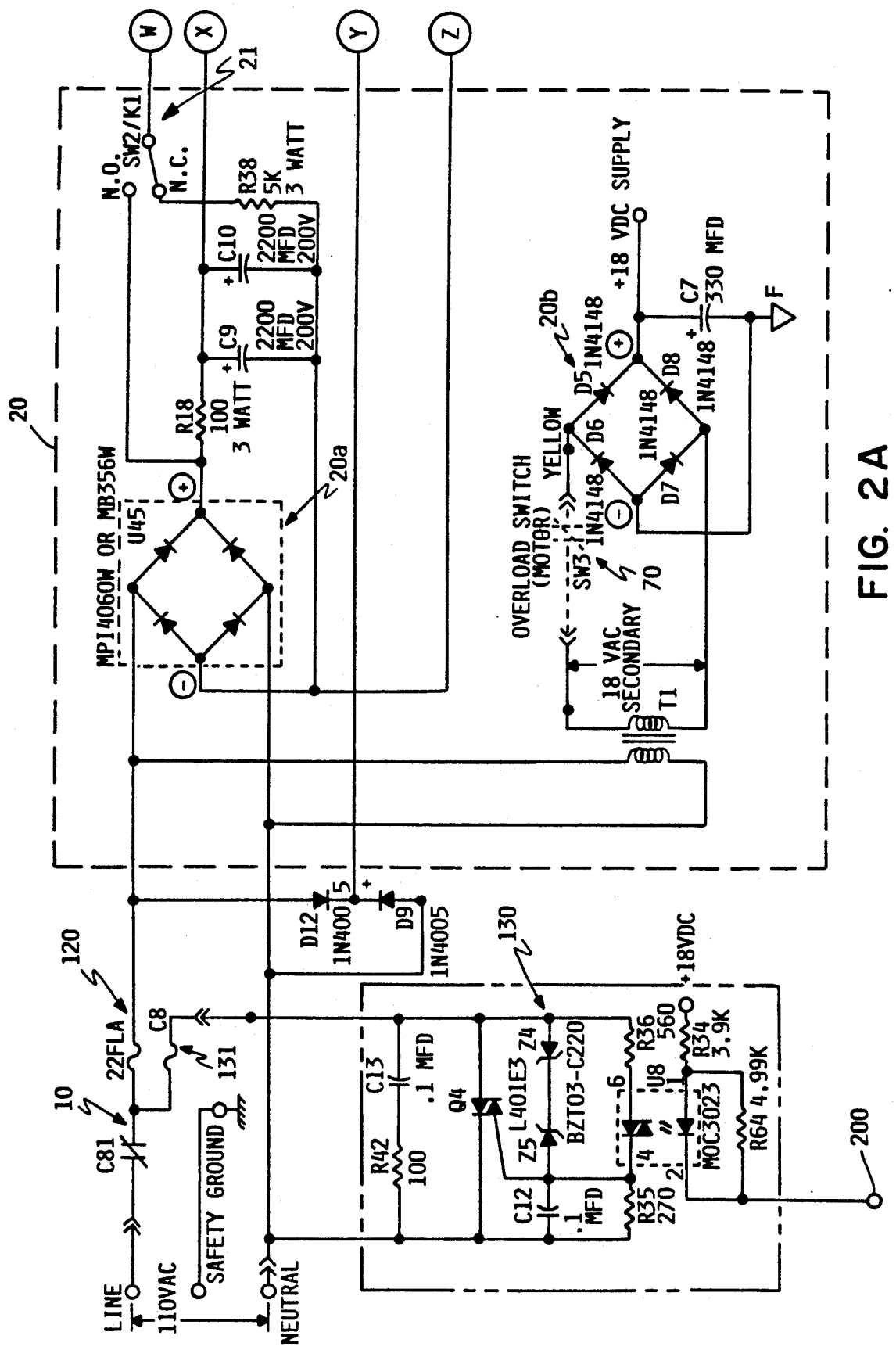
FIG. 2 shows a schematic diagram of the safety circuits and power supply of the present invention.
Figure 2B:
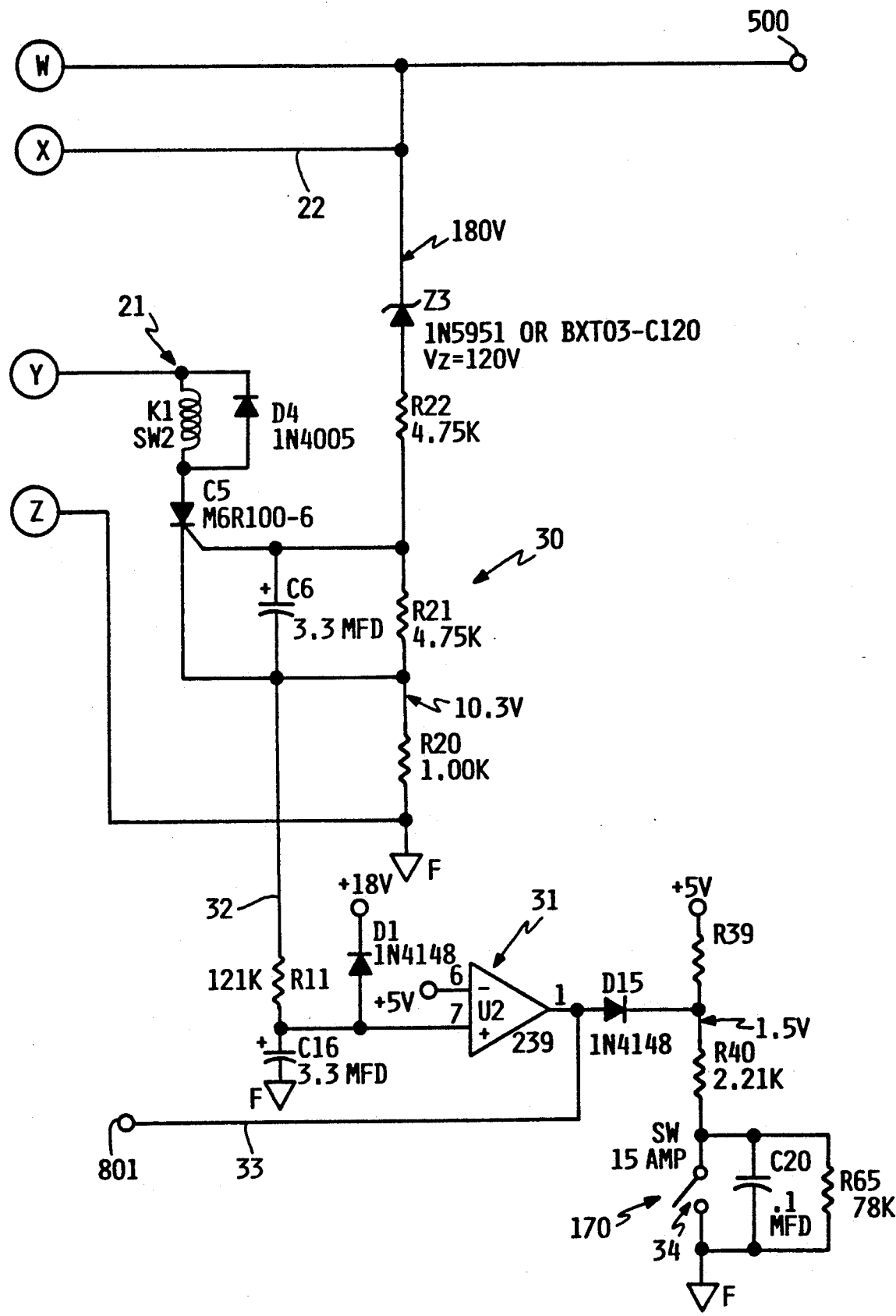

Referring next to FIG. 2, schematic diagrams are shown for a number of the circuits associated with the invention. The input line voltage is connected to a circuit breaker 10, which is connected via over-current circuit 120 to power supply 20. Power supply 20 has an output voltage line connected to terminal 500, and also has an output connection via line 22 to delay circuit 30. Power supply 20 includes a voltage bridge circuit 20a for delivering an output voltage of 180 volts DC, and a voltage bridge circuit 20b for delivering an output voltage of 18 volts DC. Bridge circuit 20b is connected in series with a thermal overload switch 70, which is physically located on motor 50. The 18 volts delivered by bridge 20b is also used to develop lower DC voltages (not shown) as required by the individual circuits associated with the invention.

A system power switch (part of circuit breaker 10) is connected in series with the input alternating current voltage line. Upon activation of this switch the line voltage is impressed upon the input terminals. This permits rectifier bridge circuit 20b to immediately begin delivering the low voltage DC required for operation of the circuits. Rectifier bridge 20a delivers 180 volts DC, but this voltage is not immediately delivered to terminal 500 because the switch contacts of relay 21 are initially in the position shown in FIG. 2. The output voltage of rectifier bridge 20a begins charging the filter capacitors C9 and C10, through current limiting resistor R18, and the voltage at line 22 gradually rises to the full DC voltage level. When the voltage reaches a predetermined level the voltage across zener diode Z3 breaks down and the line voltage is impressed across the relay coil associated with relay 21. This relay coil causes relay 21 switch contacts to switch, thereby delivering the full line voltage to terminal 500.

A signal from delay circuit 30 is also connected to a comparator 31 via line 32, to produce a signal over line 33. Circuit 31 provides an input into the motor control circuit 90 (terminal 801), to disable the motor control circuit until after the delay circuit 30 applies the full DC voltage to motor 50. The signal on line 33 is the error signal, i.e., the difference between the pressure set signal (circuit 100) and the pressure monitor signal (circuit 110). This signal, connected to terminal 801, is limited by the circuits connected to 15/20 amp switch 34. This limits the motor drive duty cycle, which in effect limits the speed of motor 50 and therefore the motor 50 load current. The adjustment is accomplished by switch 34, which permits 20 amp motor load current conditions in the open position and limits the motor load current to 15 amps when in the closed position.

The over-current circuit 120 is typically a circuit breaker coil designed to open switch contacts CB1 at a current of 22 amps. A second circuit breaker coil 131 is connected as a part of over-voltage circuit 130, and operates in conjunction with zener diodes Z4 and Z5. If the line voltage exceeds the predetermined rating of zener diodes Z4 and Z5, a gating signal is sent to triac Q4, to fire the triac circuit. The firing of triac Q4 causes the second circuit breaker coil 131 in circuit breaker 10 to open the switch contact CB1, thereby disconnecting the input line voltage from power supply 20. Triac Q4 may be a commercially obtained product, as for example, Type L401E3, manufactured by Tecor.

A second signal line for firing triac Q4 is derived from integrated circuit U8, which is an optical electronic circuit such as Type MOC3023, manufactured by Motorola. Integrated circuit U8 incorporates a light-emitting diode, which may be activated by a signal on terminal 200. The signal on terminal 200 is associated with the control signals generated by over-pressure circuit 140, locked rotor circuit 150, and output short circuit 160, in a manner to be hereinafter described. If any of these control circuits generate the signal which is received at terminal 200, the light-emitting diode of integrated circuit U8 will generate a gating signal to triac Q4, thereby activating the coil 31 of circuit breaker 10 and disconnecting the input line voltage from power supply 20.

Figure 3:
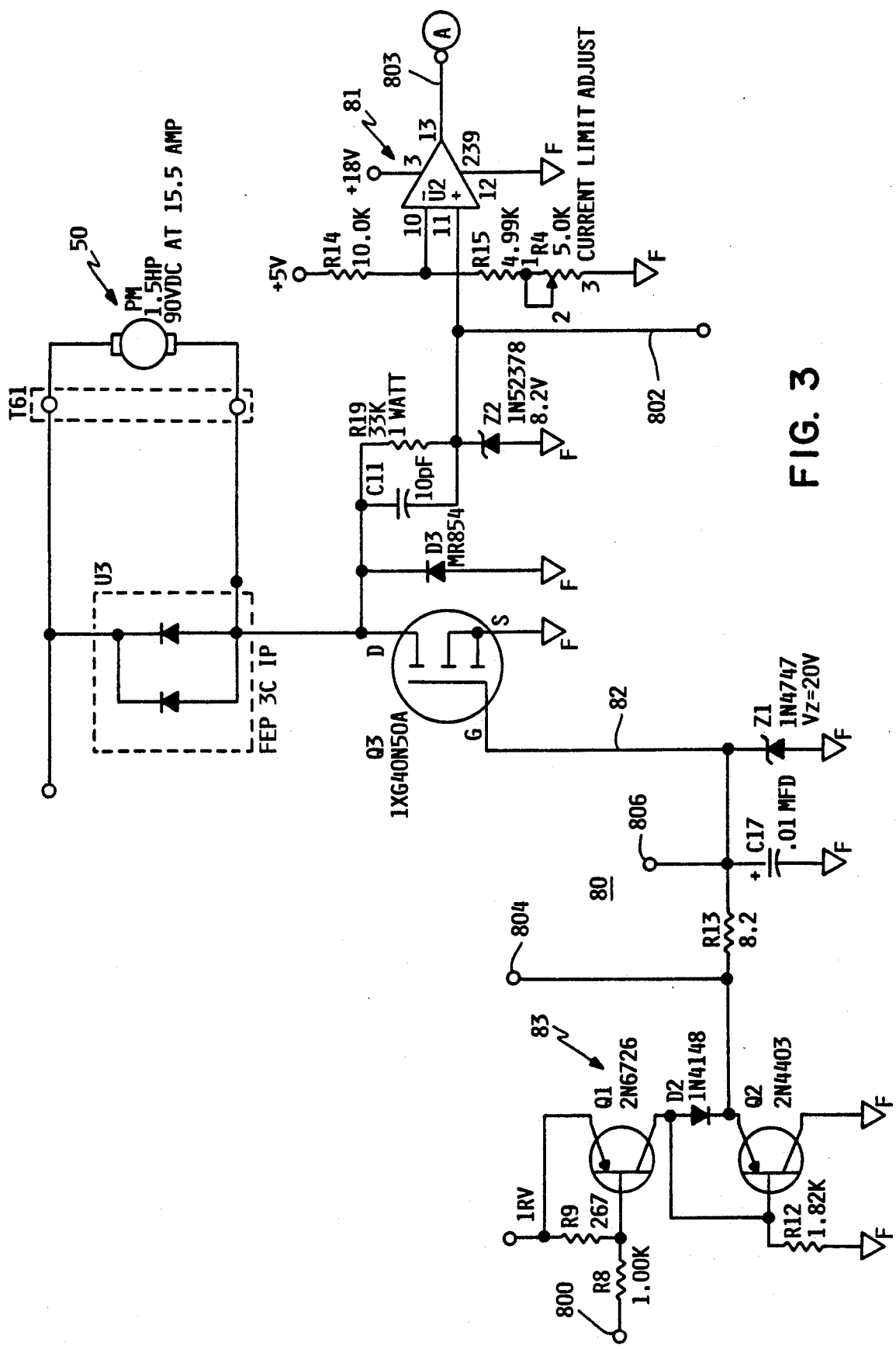
FIG. 3 shows a schematic diagram of the motor drive circuit.

Referring next to FIG. 3, the motor drive circuit 80 and other circuits associated with motor 50 are illustrated. The DC line voltage is applied at terminal 500, which is connected to the series combination of motor 50 and motor drive circuit 80. Motor drive circuit 80 has associated therewith a MOSIGT transistor switch Q3, which may be Type 1XGH40N5OA, manufactured by IXYS. Transistor switch Q3 has an input gating line 82 which is activated by an input control signal received at terminal 800 from motor control circuit 90. The input signal at terminal 800 causes transistor switching circuit 83 to turn on, thereby turning on transistor switch Q3 and permitting the flow of DC current through motor 50. The magnitude of this current is monitored by the circuit including resistor R19 and zener diode Z2, to generate a signal on line 802 whenever the current level reaches a predetermined excessive level. The signal on line 802 is coupled to output short detector circuit 160, in a manner to be hereinafter described. The current through transistor switch Q3 is also monitored by I SET circuit 81, which has one input which is preset to a maximum current limitation by potentiometer P4, and the other input is connected to the signal on line 802. If the transistor switch Q3 output current exceeds the preset limits set at the input of I SET circuit 81, a signal is generated on line 803 which is coupled to motor control circuit 90, to inhibit motor drive signals from the motor control circuit until the current is reduced below the preset limit.

Figure 4:
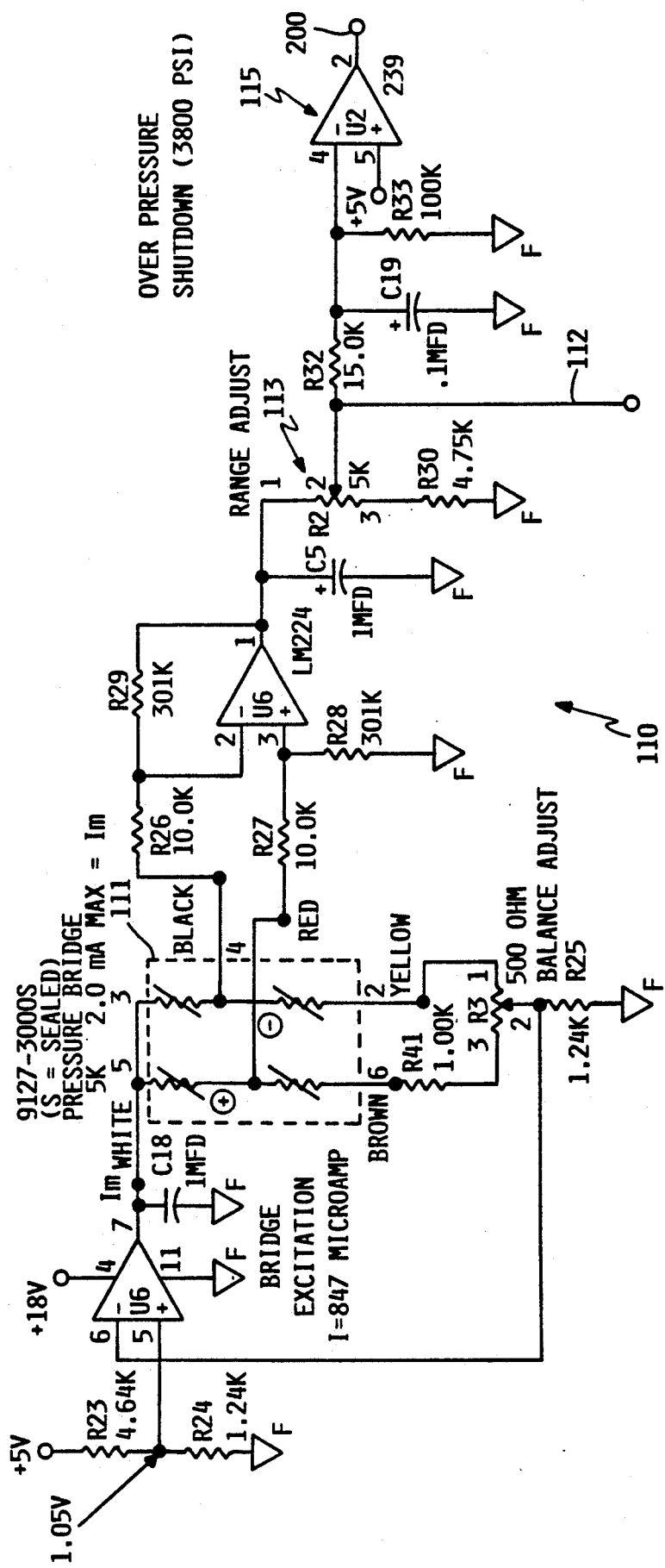
FIG. 4 shows a schematic diagram of the pressure monitor circuit.

Referring next to FIG. 4, a schematic diagram of the pressure monitor circuit 110 is shown. Pressure monitor circuit 110 includes a pressure transducer 111 which is physically positioned to monitor the output liquid pressure from pump 60. Pressure transducer 111 is a sealed pressure bridge which is commercially available; for example, a pressure bridge manufactured by I.C. Sensors, under Model Designation 9127-3000S. Pressure transducer 111 produces an output signal which is representative of liquid pressure, and this output signal is coupled to motor control circuit 90 via line 112. A preset range adjust potentiometer 113 may be set to a maximum permissible pressure setting, and whenever the sensed pressure exceeds this value, a signal is generated by switching amplifier 115 to terminal 200 (FIG. 2) to activate circuit breaker 10.

Figure 5A:
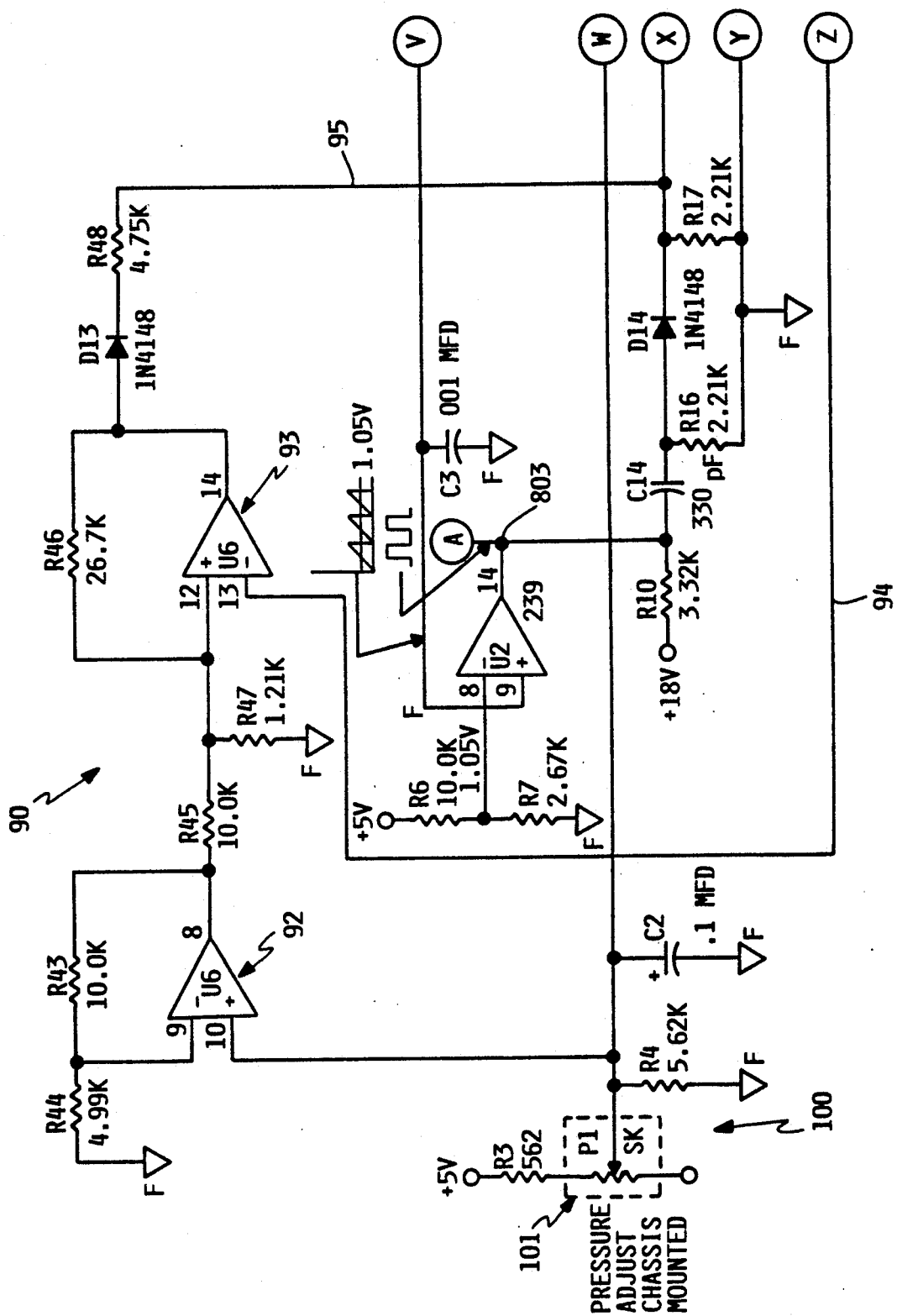
FIG. 5 shows a schematic diagram of the motor control circuit.

FIG. 5 shows the pressure setting circuit 100 and the motor control circuit 90. Pressure setting circuit 100 comprises a pressure adjust potentiometer 101 which is coupled as an input via line 91 to motor control circuit 90. The potentiometer 101 voltage is also coupled as an input to amplifier 92, where it is amplified and sent to comparator circuit 93 as an input. Comparator circuit 93 also receives an input via line 94 from terminal 801, which represents the difference between the sensed pressure and the demand pressure. Comparator 93 generates a signal on line 95 to shut down the motor control circuit 90 whenever the difference pressure signal (line 94) becomes less than the pressure set signal. This establishes a hysteresis effect relating to the amount of pressure drop which will be permitted before the motor control circuit 90 is reactivated. Motor control circuit 90 includes an integrated circuit Type SG3524BN, manufactured by Silicon General, designated as circuit U1, and certain other associated circuits. The dotted lines in FIG. 5 show the functional block diagram of the circuits within integrated circuit U1, and the external pin connections are also illustrated adjacent integrated circuit U1. Circuit U1, in combination with its associated circuits illustrated on FIG. 5, generates a motor drive signal on terminal 800. It also generates a signal on terminal 801 which is representative of the difference between the sensed output pressure and the demand output pressure, as set by pressure set circuit 100. The signal on terminal 801 is connected as an input to the lock rotor circuit 150 (FIG. 6), the other inputs to be hereinafter described.

Figure 6:
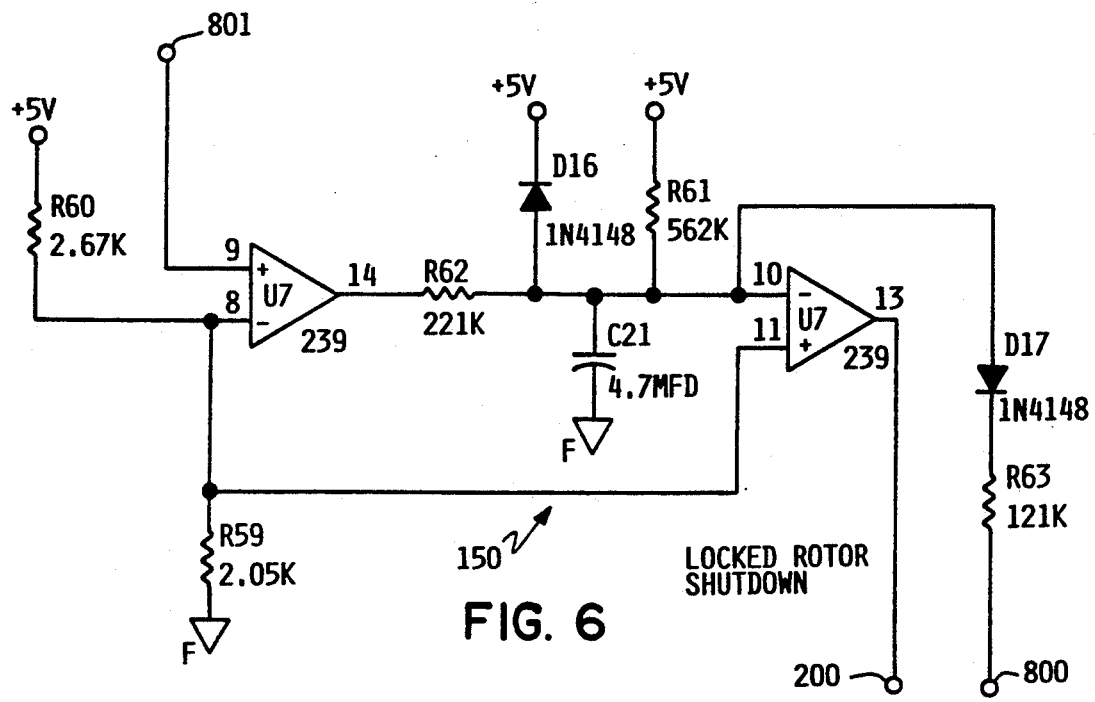
FIG. 6 shows a schematic diagram of one of the safety circuits.

FIG. 6 shows a schematic diagram of locked rotor circuit 150, which has a first input from terminal 801, representative of the difference between the pressure set point and the actual pressure measurement. A second input is received from terminal 800, derived from motor control circuit 90, which is the DC motor drive signal. If the DC motor drive signal and the pressure difference signal exceed certain predetermined levels, circuit 150 determines that the condition is caused by a locked rotor condition, and a shutdown signal is generated to terminal 200. This causes activation of circuit breaker 10 and disconnects the input line voltage from power supply 20.

Figure 7:
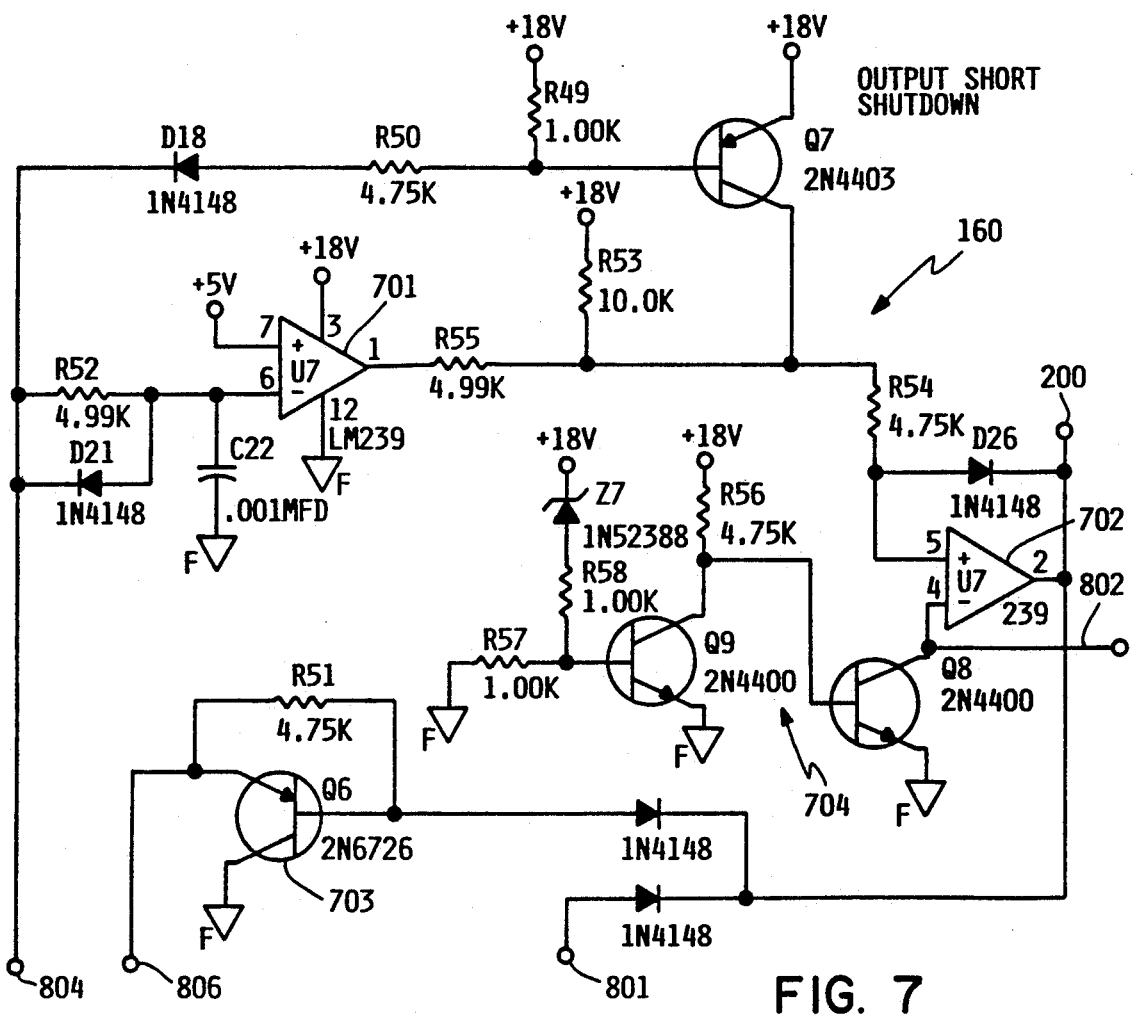
FIG. 7 shows a schematic diagram of another of the safety circuits.

FIG. 7 shows a schematic diagram of the output short detector circuit 160. Output short detector circuit 160 receives an input via terminal 804 from the amplifiers 83 which drive transistor switch Q3 (FIG. 3). This signal indicates that a drive voltage has been applied to transistor switch Q3. This signal is received by comparator 701 as an input. Comparator 701 thereby generates a reference voltage input to comparator 702. The other input into comparator 702 is received via line 802, and is representative of the motor drive current through transistor switch Q3. The output signal from comparator 702 is connected to terminal 200, terminal 801, and to voltage clamping circuit 703. In operation, the output signal from comparator 701 sets a reference input to comparator 702, which is representative of the maximum permissible drive current into transistor switch Q3. The signal on line 802 represents the motor load current. When the motor load current on line 802 exceeds the maximum permissible drive current, comparator 702 generates an output signal which turns on clamping circuit 703, which clamps the input signal to transistor switch Q3 to ground (terminal 806). This clamping signal is activated within 3-4 microseconds, shutting off transistor switch Q3 practically instantaneously. Simultaneously, comparator 702 generates a clamping signal to terminal 200 to activate the circuit breaker described herein, and a clamping signal to terminal 801 to clamp the error signal to ground. Once the signal has been generated by comparator 702, it remains latched by diode D20 until a subsequent power turn on. When power is subsequently restored to the system, the power-up circuit 704 temporarily inhibits the signal on line 802 to restore comparator 702 output to a non-shorting indication. Output short detector circuit 160 will sense a motor shorting condition caused by equipment failure, or by problems encountered during maintenance procedures.

In operation, the various switch and control settings described herein are made prior to or at the time the system is initially turned on. When the system is turned on, an initial delay occurs prior to full power being applied to the motor, to enable time for charging of the filter capacitors in the power supply. The pressure setting described herein is compared against the actual liquid pressure, which is monitored by the pressure transducer coupled to the pump liquid output line, to cause a motor drive signal to be generated. The motor drive signal rotates the motor and thereby reciprocates the pump until pump output pressure has built up to a point approximately equal to the pressure setting. At this point the motor turns off and the system becomes deactivated until such time as the liquid output pressure drops. Such an output pressure drop will occur when liquid begins flowing from the pump to a destination, which will cause the system to become reactivated to reciprocate the pump to redevelop the set point pressure. If a voltage surge occurs on the input lines, or if the system draws excessive current from the input lines, the circuit breaker will disconnect line voltage from the power supply. Alternatively, if the motor rotor becomes locked by mechanical malfunction, or if the liquid pumping system creates an excessive pressure demand, or if a short circuit occurs anywhere within the motor powering circuits, signals are generated to activate the circuit breaker and disconnect the input line voltage from the power supply. The system is thereby protected from faults in input line voltage, mechanical linkages, and faults in the liquid pumping and delivery system. In all cases, these faults cause power to become disconnected from the system to thereby protect the system.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A motor drive circuit for utilizing power from an alternating current source to drive a direct current motor which is mechanically coupled to a liquid pump, comprising:
   a) a circuit breaker connected to said alternating current source, said circuit breaker having a plurality of circuit disconnecting inputs;
   b) a direct current power supply connected to said circuit breaker and to said motor;
   c) a motor drive circuit connected to said motor, said motor drive circuit having at least two control inputs;
   d) a pressure set circuit connected to one of said at least two control inputs, said pressure set circuit having means for presetting a desired pump output pressure;
   e) a pressure sensing circuit connected to another of said at least two control inputs, said pressure sensing circuit having means for sensing said pump liquid pressure;
   f) means for sensing the current passing into said power supply from said alternating current source, including means for disconnecting said circuit breaker if the sensed current exceeds a predetermined limit;
   g) means for sensing the voltage of said alternating current source, including mean for activating one of said circuit breaker disconnecting inputs if the sensed voltage exceeds a predetermined limit;
   h) means for sensing the current through said motor, including means for activating one of said circuit breaker disconnecting inputs if the sensed current exceeds a predetermined limit;
   i) means connected to said pressure sensing circuit for sensing a predetermined maximum pressure, including means for activating one of said circuit breaker disconnecting inputs if the predetermined maximum pressure is sensed; and
   j) means for sensing the difference between the preset pressure setting and the sensed output pressure and generating a difference signal, and means for comparing this difference signal with a signal representative of motor current, including means for activating one of said circuit breaker disconnecting inputs if the compared signals exceed a predetermined limit.

2. The apparatus of claim 1, wherein at least one of said circuit breaker plurality of circuit disconnecting inputs further comprises a semiconductor switch connected to a circuit breaker coil, said switch having an input gate, and a light-activated switch connected to said input gate said light-activated switch having a light-emitting diode forming a part thereof, said light-emitting diode connected to said means for sensing the direct current through said motor, and to aid means for sensing a predetermined maximum pressure, and to said means for comparing said difference signal with said signal representative of motor current.

3. The apparatus of claim 1, wherein said means for sensing the current through said motor further comprises a manually switchable circuit for setting either of two predetermined limits.

4. The apparatus of claim 1, wherein said motor drive circuit further comprises a comparator circuit for generating a motor drive signal in response to a first predetermined comparison of signals from said pressure set circuit and said pressure sensing circuit, and for shutting off said motor drive signal in response to a second predetermined comparison of signals from said pressure set circuit and said pressure sensing circuit.

5. The apparatus of claim 4, wherein said first and second predetermined comparisons are different values.

6. In a motor drive circuit for utilizing power from an alternating current line, converted to a direct current voltage by a power supply to drive a direct current motor connected to a liquid pump, through a motor drive circuit, the improvement in safety circuits comprising:
   a) a circuit breaker in said alternating current line, said circuit breaker having a plurality of sensing elements for disconnecting said line;
   b) means for monitoring the current through said alternating current line and for activating one of said plurality of sensing elements at a predetermined current level;
   c) means for monitoring the voltage of said alternating current line and for activating one of said plurality of sensing elements at a predetermined voltage level;
   d) means for monitoring the current through said direct current motor and for activating one of said plurality of sensing elements at a predetermined current level;
   e) means for monitoring the pressure of said liquid pump and for activating one of said plurality of sensing elements at a predetermined pressure level; and
   f) means for monitoring the motor drive circuit current and for activating one of said plurality of sensing elements at a predetermined current level.

7. The apparatus of claim 6, further comprising means for monitoring the temperature of said motor and for disabling said power supply at a predetermined temperature.

8. The apparatus of claim 6, wherein at least one of said plurality of sensing elements of said circuit breaker further comprises a switch activated by an optical element, the optical element being activated by an electrical signal.

9. The apparatus of claim 6, wherein said means for monitoring the current through said direct current motor further comprises a manually switchable circuit for presetting one of at least two predetermined current levels.

* * * * *